INVENTOR.
ERNEST M. MONROE
ATTORNEY

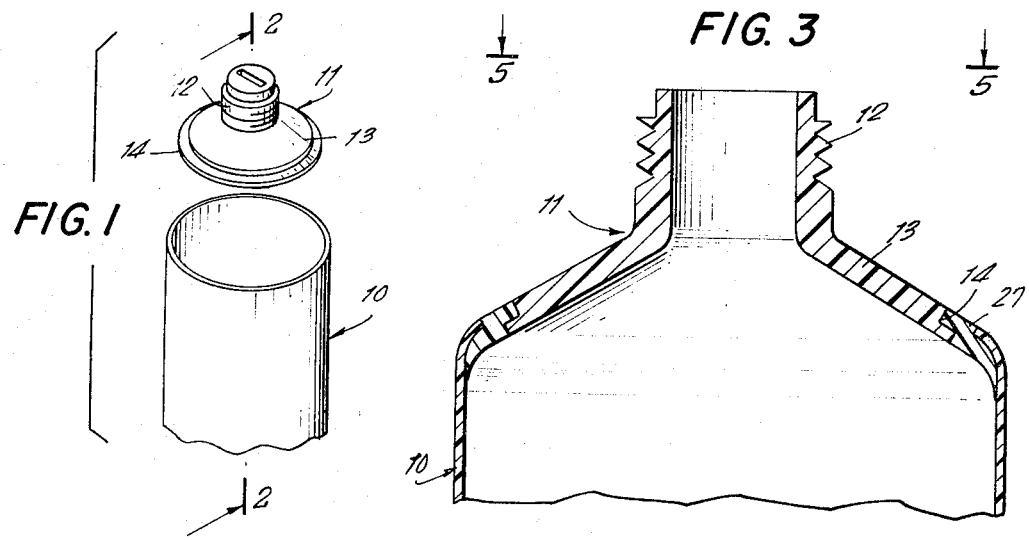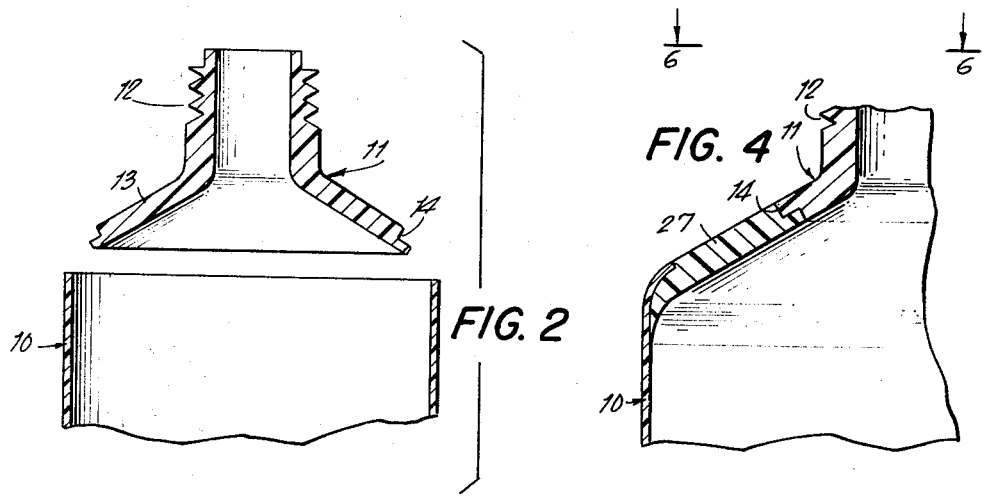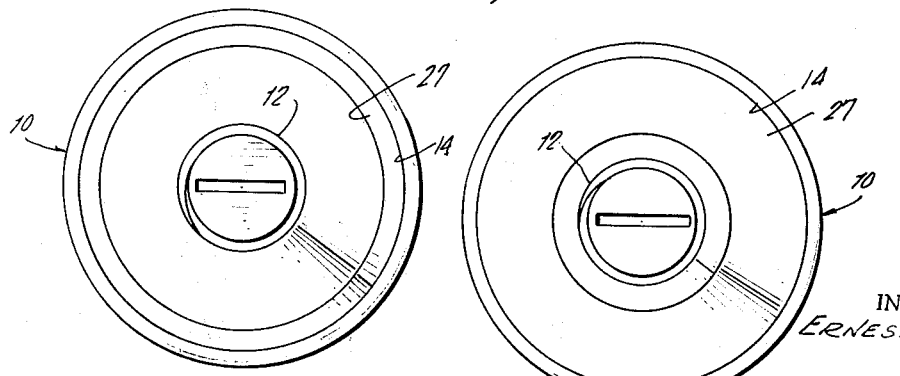

Dec. 5, 1967  E. M. MONROE  3,356,263
INJECTION MOULDED PLASTIC TUBE AND METHOD
Filed April 8, 1966  4 Sheets-Sheet 3
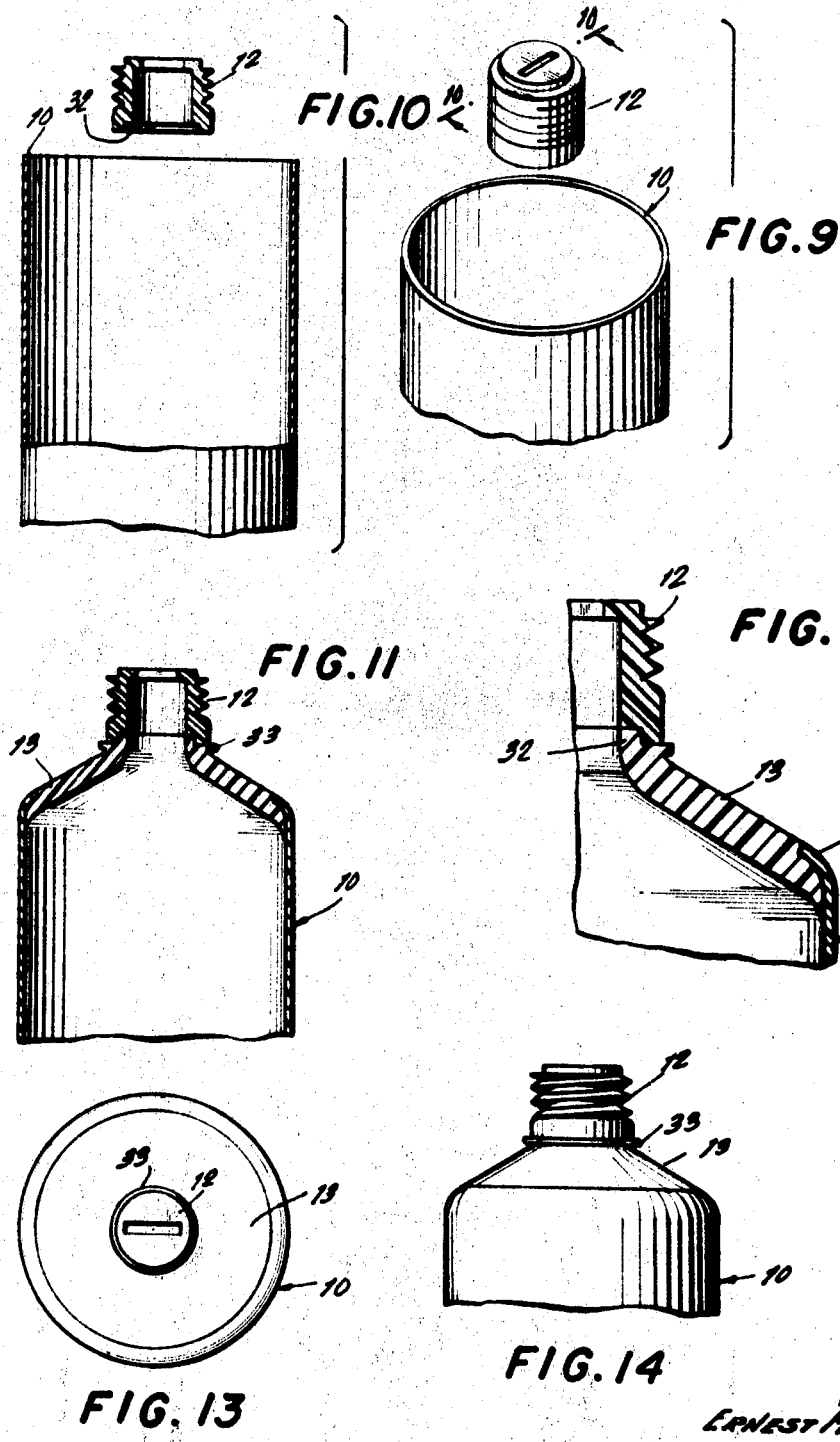
INVENTOR.
ERNEST M. MONROE
BY
ATTORNEY Dec. 5, 1967     E. M. MONROE     3,356,263
INJECTION MOULDED PLASTIC TUBE AND METHOD
Filed April 8, 1966     4 Sheets-Sheet 4

INVENTOR.
ERNEST M. MONROE
BY

ATTORNEY

United States Patent Office 3,356,263
Patented Dec. 5, 1967

3,356,263
INJECTION MOULDED PLASTIC TUBE AND METHOD
Ernest M. Monroe, Newport, Ark., assignor to Victor Metal Products Corp., Newport, Ark., a corporation of Delaware
Filed Apr. 8, 1966, Ser. No. 541,148
9 Claims. (Cl. 222—107)

ABSTRACT OF THE DISCLOSURE

An injection moulded plastic tube having a discrete tubular body portion, a threaded neck portion and a band of plastic material moulded therebetween to form a unitary structure.

---

This invention relates to dispensing containers and their method of manufacture and more particularly containers in which the contents are ejected through an orifice by pressure on the walls thereof, commonly known as collapsible tubes.

Collapsible tubes have heretofore been made of metal, plastic, and laminates of metal and plastic by a variety of processes including impact extrusion and moulding. In the manufacture of plastic collapsible tubes by presently known methods, the relatively slow rate of production and the high amount of rejects has substantially increased the cost of the tubes.

Accordingly, it is an object of the present invention to provide an inexpensive plastic collapsible tube.

Another object of the present invention is to provide a plastic collapsible tube which will remain fluid tight despite repeated squeezing.

A further object of the present invention is to provide a plastic collapsible tube in which a minimum amount of material is employed, capable of high speed manufacture.

An object of the present invention is to provide a collapsible tube of attractive appearance which lends itself to a wide variety of color combination.

Still another object of the present invention is to provide a method for attaching preformed tube components together by injection moulding to form a unitary structure.

A feature of the present invention is the use of a preformed neck and shoulder member and tubular body member joined together by a band of extruded plastic.

Another feature of the present invention is the use of stepped surfaces on the preformed shoulder to increase the area of contact of the injected plastic material.

A further feature of the present invention is the use of different colored elements and transparent members to achieve a variety of decorative effects.

A feature of another embodiment of the invention is the use of a preformed neck member, a preformed tube and an interconnecting band of moulded material forming a shoulder.

The invention consists of the construction, combination and arrangement of parts, as herein illustrated, described and claimed.

In the accompanying drawings, forming a part hereof is illustrated two forms of embodiment of the invention, and in which:

FIGURE 1 is a somewhat exploded view of a portion of a plastic tube made in accordance with the present invention.

FIGURE 2 is a cross sectional view taken on line 2—2 in FIGURE 1 somewhat enlarged.

FIG. 3 is a cross sectional view of a portion of a collapsible tube made in accordance with the present invention on an enlarged scale.

FIGURE 4 is a fragmentary cross sectional view similar to FIGURE 3 showing the use of a wide band of injected material.

FIGURE 5 is a top plan view taken on line 5—5 in FIGURE 3.

FIGURE 6 is a top plan view taken on line 6—6 in FIGURE 4.

FIGURE 9 is a somewhat exploded view of the neck and tube body elements employed in the second embodiment of the present invention.

FIGURE 10 is a cross sectional view taken on line 10—10 in FIGURE 9.

FIGURE 11 is a view in vertical section of a complete embodiment of a collapsible tube made in accordance with the present invention.

FIGURE 12 is a fragmentary vertical sectional view somewhat enlarged of the tube shown in FIGURE 11.

FIGURE 13 is a top plan view of the collapsible tube shown in FIGURES 11 and 12.

FIGURE 14 is a fragmentary view in side elevation of the collapsible tube shown in FIGURE 13.

Figure 7:
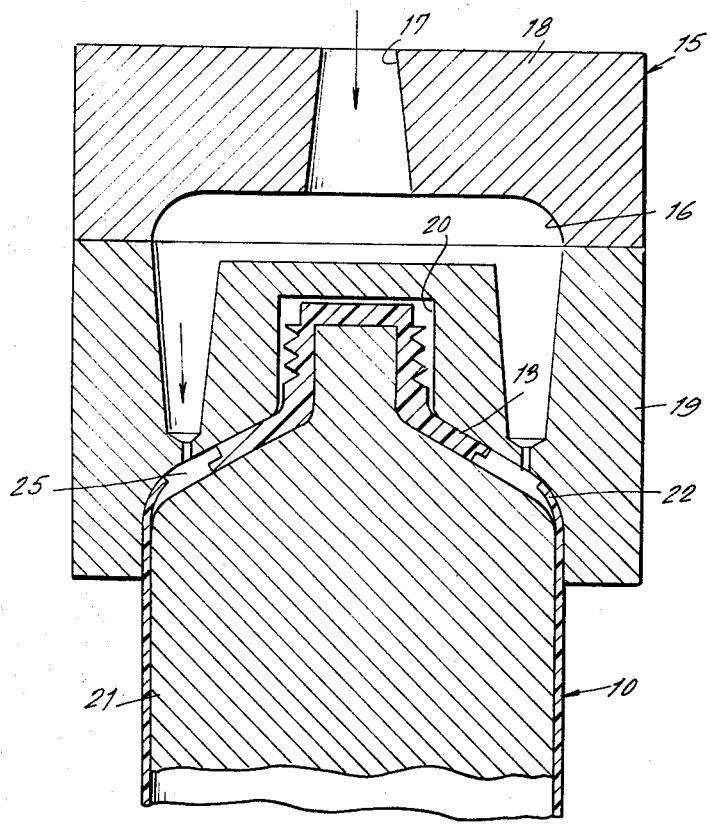
FIGURES 7 and 8 are views in longitudinal section showing the manner in which the tube elements are joined to form an integral tube structure.

Referring to the drawings and particularly to FIGURES 1, 2 and 3, 10 indicates an elongated hollow, cylindrical tube body which may be made of extruded polyethylene or any other suitable plastic material. The tube 10 may be formed in continuous lengths and thereafter cut off to the desired length. The tube 10 may be cut off to the desired length either before or after the attachment of the neck and shoulder member 11 in the manner hereinafter set forth.

The neck and shoulder member 11 consists of a threaded neck 12 and an outwardly extending shoulder portion 13 which is integral with the neck 12. As shown in FIGURES 1–4 the neck 12 is formed with a stepped annular portion 14 at the outer edge thereof for a hereinafter more fully described purpose.

Figure 8:
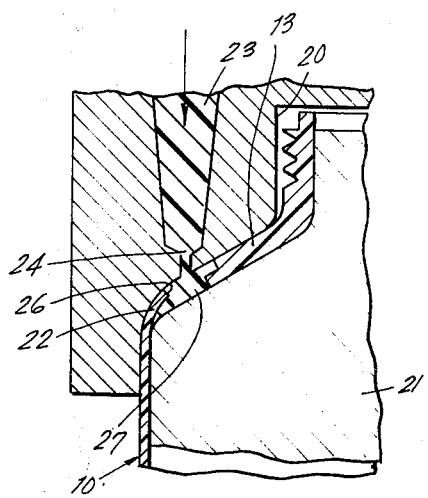
Figure 15:
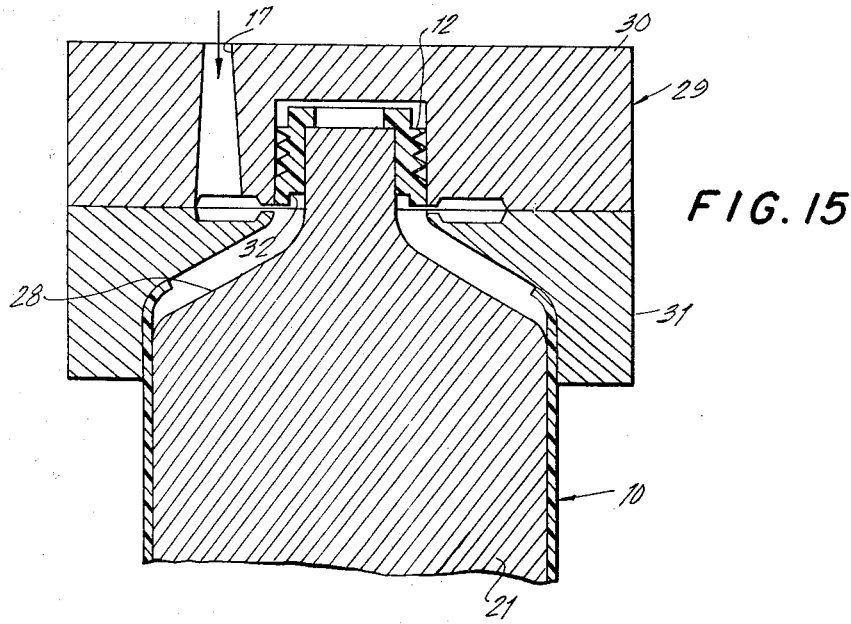
FIGURES 15 and 16 are views in longitudinal section showing the manner in which the tube elements are joined to form an integral tube.

The neck and shoulder member 11 is joined to the tubular body portion 10 by means of the moulding apparatus 15 shown in FIGURES 7 and 8. The moulding apparatus 15 consists of a two part die connected to a source of plastic (not shown). The source of plastic may be for example, an injection moulding device such as is well known in the art. A cavity 16 is provided within the die 15 and a port 17 in the upper portion 18 of the two part die 15 permits plastic to be forced into cavity 16. The lower portion of the die 15 indicated at 19 in FIGURES 7 and 8, is formed with a recess 20 to receive the neck and shoulder portion 11 of the tube and also the tubular body portion 10. A mandrel 21 slipped inside of the tubular portion 10 and the neck and shoulder portion 11 supports these member internally during the injection operation. As shown in FIGURE 7 the neck and shoulder portion are supported in spaced relationship to the body portion 10 prior to the injection of the plastic. In addition, the end of the body portion 10 as it is received within the cavity 20 is bent inwardly as indicated at 22 in the direction of the shoulder 13.

With the neck and shoulder member and body portion 10 assembled as shown in FIGURE 7 the plastic 23 is forced through the gate 24 into the space 25 between the shoulder 13 and the end of the tubular body 10. The plastic 23 forms a half lap joint with the stepped portion 14 of the shoulder 13 and the end 22 of the tubular body 10 also forms a half lap joint with the plastic 23 by reason of the supporting mandrel and die member 19 as indicated at 26 in FIGURE 8. These half lap joints provide additional surface whereby the strength of the finished tube is greatly improved at the place where the neck and shoulder element is joined to the body member 10. As a result, the tube is capable of withstanding the normal pressures imposed upon it in dispensing the contents.

Following the injection of the plastic material 23 the mandrel 21 is withdrawn from the mould and the finished tube stripped therefrom.

The present apparatus is capable of forming a wide variety of tubes with only slight modification. Thus it will be seen that the plastic 23 which eventually forms the band 27 joining the shoulder portion 13 and the end of the tubular member 10 can be made in various widths as illustrated in FIGURES 5 and 6. It is also possible to extrude transparent plastic material as the band between the other members of the tube so that the contents may be observed by the user. Additionally, various colors of elements may be employed to give the tube interesting decorative effects. Thus, the neck and shoulder portion 11 could be one color, the body portion 10 a second color, and the band 27 either a third color or transparent. If desired, advertising information might be moulded into the under portion of the band and viewed through the band if made of a transparent material.

The embodiment shown in FIGURES 1–8 requires that the plastic 23 be injected into the space between the end of the shoulder 13 and the inwardly bent portion 22 of the tube body 10. Where the injected material is transparent the finished product presents an unsightly mark from the gate 24 through which the plastic 23 passes. In the embodiment shown in FIGURES 9–17, however, the plastic 23 is injected into the cavity 28 of the mould 29 at a point immediately below the neck 13. In this embodiment of the invention the neck portion 12 as best shown in FIGURES 9 and 10 is not connected to any shoulder 11 but is a single element.

Figure 17:
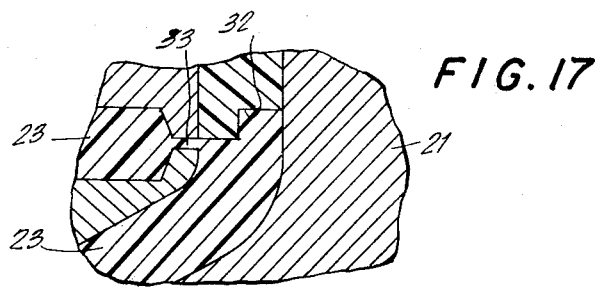
FIGURE 17 is a fragmentary view somewhat enlarged of a portion of the mould and extruded material shown in FIGURE 16.

The neck portion 12 is held within the upper part 30 of the mould 29 while the tubular body 10 is supported within the lower portion 31 of the said mould. The lower portion 31 of the mould is provided with a cavity 28 which is in the form of a tube shoulder. The inner mandrel 21 forms the inner wall of the cavity 28 and is spaced from the mould portion 31 a distance equal to the desired thickness of the shoulder to be formed. The bottom of the neck portion 12 is provided with a stepped inner surface 32 to improve the bond between the injected plastic 23 and the neck 12 at this point, as best shown in FIGURE 17.

Figure 16:
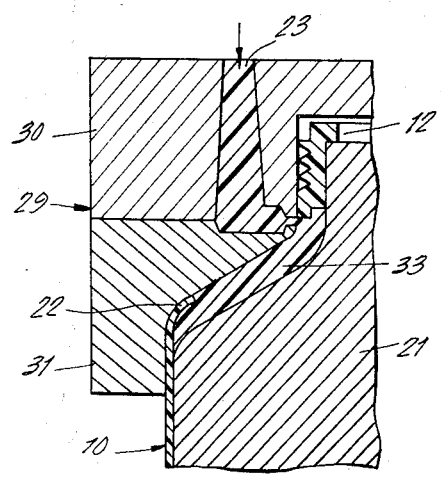

The plastic 23 is injected into the cavity 28 at a point immediately below the thread of the neck 12. It is preferred to inject the plastic on a line completely around the neck 12 thereby leaving a small unobtrusive shoulder 33 on the completed tube (see FIGURE 14). The reminder of the outwardly extending portion 13 of the shoulder 11 is thus clear of moulding marks and highly decorative. The plastic 23 which fills the cavity 28 also forms a half-lapped joint with the inwardly bent portion 22 of the tubular body 10 as shown in FIGURE 16.

In this embodiment, it is also possible to use plastic for injection of a different color from that of the neck 12 and body 10 in order to achieve artistic and attractive results.

From the foregoing it will be seen that there has been provided a novel plastic tube structure and method of manufacture which is inexpensive, capable of high speed production, attractive in design, and versatile in its use.

Having thus fully described the invention, what is claimed as new and desired to be secured by Letters Patent of the United States is:

1. A plastic collapsible tube comprising a plastic tubular body, a threaded neck portion and a band of plastic material moulded between the body portion and neck portion in the shape of a shoulder to form a unitary collapsible tube structure.

2. A tube according to claim 1 in which the shoulder portion extends outwardly and radially from the neck and the neck and shoulder are provided with an annular stepped portion where they join adjacent elements of the tube.

3. A tube according to claim 1 in which a portion of the shoulder portion extends outwardly and radially from the neck and is provided with an annular stepped portion around the free edge thereof and the tubular portion is inwardly bent at the band end thereof whereby the band abuts and overlies a portion of both the shoulder and the body.

4. A tube according to claim 1 in which the band is formed of a transparent plastic material.

5. A tube according to claim 1 in which the tubular member, the neck and shoulder member and the band are made of dissimilar plastic materials.

6. The method of forming a plastic collapsible tube comprising supporting a tubular plastic body portion upon its inner surfaces, placing a plastic neck portion upon the said body support in spaced relationship from said body portion and thereafter injecting a band of plastic material between the body portion and neck to form a unitary tube structure.

7. The method according to claim 6 in which the end of the body portion is inwardly bent before the band material is injected.

8. The method according to claim 6 in which the end of the body portion is inwardly bent and held in spaced relationship to the support before the band material is injected whereby the band material overlaps and underlies the end of the body portion.

9. The method according to claim 6 in which the injected material is introduced around the neck portion.

References Cited

UNITED STATES PATENTS

| | | | |
|---|---|---|---|
| 2,119,926 | 6/1938 | Quittner | 222—107 |
| 3,260,411 | 7/1966 | Dobson | 222—107 |
| 3,295,725 | 1/1967 | Brandt | 222—107 |

ROBERT B. REEVES, *Primary Examiner.*

HADD S. LANE, *Examiner.*